US011913374B1

(12) United States Patent
Buchanan

(10) Patent No.: US 11,913,374 B1
(45) **Date of Patent: *Feb. 27, 2024**

(54) ROTARY INTERNAL COMBUSTION ENGINE

(71) Applicant: William Gregory Buchanan, King George, VA (US)

(72) Inventor: William Gregory Buchanan, King George, VA (US)

(73) Assignee: United States of America, as represented by the Secretary of the Navy Chief of Naval Research, Office of Counsel, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,010

(22) Filed: Aug. 23, 2022

Related U.S. Application Data

(63) Continuation of application No. 17/172,865, filed on Feb. 10, 2021, now Pat. No. 11,421,584, which is a (Continued)

(51) Int. Cl.

| | |
|---|---|
| ***F02B 53/12*** | (2006.01) |
| ***F01C 1/22*** | (2006.01) |
| ***F01L 1/18*** | (2006.01) |
| ***F02B 53/00*** | (2006.01) |
| ***F02B 53/06*** | (2006.01) |
| ***F02B 53/10*** | (2006.01) |
| ***F02B 55/00*** | (2006.01) |
| ***F02B 55/02*** | (2006.01) |

(Continued)

(52) U.S. Cl.
CPC ................ *F02B 53/12* (2013.01); *F01C 1/22* (2013.01); *F01L 1/18* (2013.01); *F02B 53/00* (2013.01); *F02B 53/06* (2013.01); *F02B 53/10* (2013.01); *F02B 55/00* (2013.01); *F02B 55/02* (2013.01); *F02B 55/08* (2013.01); *F02B 55/14* (2013.01)

(58) Field of Classification Search
CPC .......... F02B 53/12; F02B 53/00; F02B 53/06; F02B 53/10; F02B 55/00; F02B 55/02; F02B 55/08; F02B 55/14; F01C 1/22; F01L 1/18
See application file for complete search history.

(56) References Cited

U.S. PATENT DOCUMENTS 2,116,897 A * 5/1938 Jay .......................... F02B 53/00 418/118
2,827,024 A * 3/1958 Arietti ..................... F02B 53/00 418/245

(Continued)

*Primary Examiner* — Audrey B. Walter
(74) *Attorney, Agent, or Firm* — Gerhard W. Thielman

(57) ABSTRACT

An internal combustion rotary engine that produces mechanical torque is provided. The engine includes an annular planar housing, a rotor, and first and second valves. The planar housing has a substantially circular annulus flanked by first and second cavities and an axial shaft disposed between the cavities. The rotor is disposed on the shaft and rotates within the annulus; The first and second valves are disposed within respective the cavities. Each valve has an arc wedge having outer convex surface and an inner concave surface, a shaft hole between and parallel to the surfaces along a rocking axis, and a pivot shaft that passes through the shaft hole to enable the wedge to rock back and forth within the cavity.

3 Claims, 10 Drawing Sheets

Related U.S. Application Data continuation of application No. 16/668,530, filed on Oct. 30, 2019, now Pat. No. 11,143,098.

(60) Provisional application No. 62/828,595, filed on Apr. 3, 2019.

(51) Int. Cl.
*F02B 55/08* (2006.01)
*F02B 55/14* (2006.01)

(56) References Cited

U.S. PATENT DOCUMENTS

| | | | | | |
|---|---|---|---|---|---|
| 3,913,534 | A * | 10/1975 | Bratten | F02B 55/06 | 123/215 |
| 3,924,976 | A * | 12/1975 | Hinckley | F01C 1/46 | 418/8 |
| 4,446,829 | A * | 5/1984 | Yeager | F01C 1/46 | 418/248 |
| 4,860,704 | A * | 8/1989 | Slaughter | F02N 9/04 | 123/237 |
| 5,704,332 | A * | 1/1998 | Motakef | F01C 1/44 | 123/56.7 |
| 2012/0103301 | A1 * | 5/2012 | Vazquez | F02B 55/02 | 418/191 |

* cited by examiner

ROTARY INTERNAL COMBUSTION ENGINE

CROSS REFERENCE TO RELATED APPLICATION

The invention is a Continuation, claims priority to and incorporates by reference in its entirety of U.S. patent application Ser. No. 17/172,865 filed Feb. 10, 2021, assigned Navy Case 112701 and issued as U.S. Pat. No. 11,421,584, which is a Continuation of U.S. patent application Ser. No. 16/668,530 filed Oct. 30, 2019, assigned Navy Case 105803 and issued as U.S. Pat. No. 11,143,098.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to rotary internal combustion engines. In particular, the invention relates to internal combustion engines using a rotor, valves and chambers absent the use of a piston.

Internal combustion engines that employ spinning rotors instead of linearly translating pistons date back to the nineteenth century, including a concept by Joseph Webb (British Patent 1216). Other than Felix Wankel's design (U.S. Pat. No. 2,988,008), few have seen commercial success, in contrast to various piston-driven types.

SUMMARY

Conventional rotary internal combustion engines yield disadvantages addressed by various exemplary embodiments of the present invention. In particular, various exemplary embodiments describe a housing with chambers accessible by pivoting flap valves (also called vanes). In particular, exemplary embodiments provide a pivoting flap valve for an internal combustion rotary that produces mechanical torque while the valve oscillates. The engine includes an annular planar housing with a substantially circular annulus flanked by first and second cavities, an axial shaft, a rotor disposed on the shaft and rotating within the annulus. The valve is disposed within one cavity of said cavities and includes an arc wedge and a pivot shaft. The wedge has outer convex surface and an inner concave surface and a shaft hole between and parallel to the surfaces along a rocking axis. The pivot shaft passes through the shaft hole that enables the wedge to rock back and forth within the cavity in the annular planar housing without interference with the cam block. Each valve includes indents to pass around fore and aft circular wings on a rotor.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
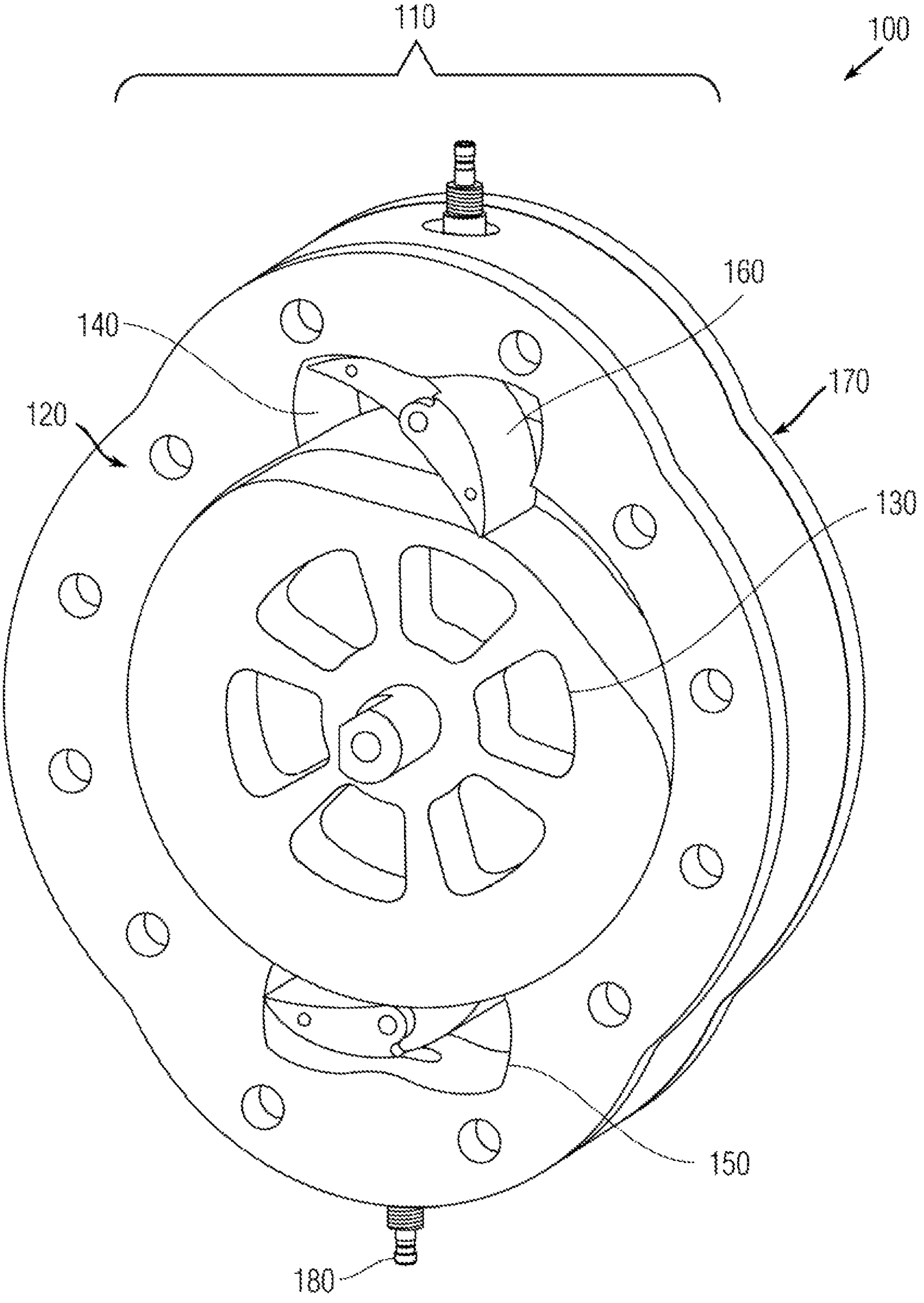
FIG. 1 is a perspective view of a first rotary engine assembly.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in centimeters (cm) and meters (m), mass in grams (g) or kilograms (kg), time in seconds (s), angles in degrees (°), force in newtons (N), temperature in kelvins (K), energy in joules (J), and frequencies in gigahertz (GHz). Supplemental measures can be derived from these, such as density in grams-per-cubic-centimeters (g/cm$^3$), moment of inertia in gram-square-centimeters (kg-m$^2$) and the like.

A rotary engine increases power over a conventional reciprocating internal combustion engine by constantly spinning in the same direction without piston reversals. Additionally, a rotary engine comprises fewer parts thus reducing weight and simplifying manufacturing. Exemplary embodiments leverage these principles to deliver a high power to weight engine for all power generation needs. In particular, the exemplary rotary engine increases power over other rotary engines combining strokes, sharing space, and spinning in constant circle, without variation, aiding mechanical motion and sealing.

In particular, various exemplary embodiments provide higher power density due to combined strokes, shared space, and rotor stacking, fewer losses due to elimination of energy consuming piston reversals, improved fuel economy due to turning any number of equivalent cylinders on and off without losses, lighter weight due to elimination of counterweights at each piston, reduced weight and ease of manufacture due to elimination of cam-shaft for valve operation, ease of manufacture due to elimination of numerous components, reduced cost due to ease of manufacture and elimination of numerous parts, Increased reliability and maintainability due to simplicity of design.

True circular motion, higher power density due to combustion in the direction of rotation and potential for more equivalent cylinders in the same space, better fuel economy due to combustion in the direction of rotation and turning any number of equivalent cylinders on and off, elimination of warping due to combustion at two (or more) locations. In particular, various exemplary embodiments describe a housing with chambers accessible by flap valves. In particular, exemplary embodiments provide an internal combustion rotary engine for producing mechanical torque. The engine includes an annular planar housing, a rotor, optional sparkplugs, flap valves, an axial shaft and fore-and-aft covers. The housing includes a quadrilateral symmetry including a substantially circular annulus flanked by first and second cavities.

The rotor has a cam block sandwiched between fore and aft circular wings. The sparkplugs are respectively accessible to the second cavities. The flap valves rock within the respective cavities and within the cam block. Each valve includes indents to pass around the wings. The fuel intake provides fuel to the cavities. The axial shaft rotates the rotor within the housing. Covers, each having a center orifice and a pair of ports exposed to ambient and respectively adjacent the first and second cavities. The wings intermittently block at least one port while the rotor spins about the shaft.

FIG. 1 shows a perspective view 100 of an exemplary rotary engine assembly 110 (absent fore cover). The assembly 110 includes a housing 120 with quadrilateral elliptical geometry, a cam rotor 130, upper combustion cavity 140, lower combustion cavity 150, upper and lower flap valves 160 pivoting within those respective cavities 140, 150, an aft cover 170, and upper and lower sparkplugs 180. Within the exemplary configuration, each valve 160 is disposed between the rotor 130 and its corresponding sparkplug 180.

Figure 2:
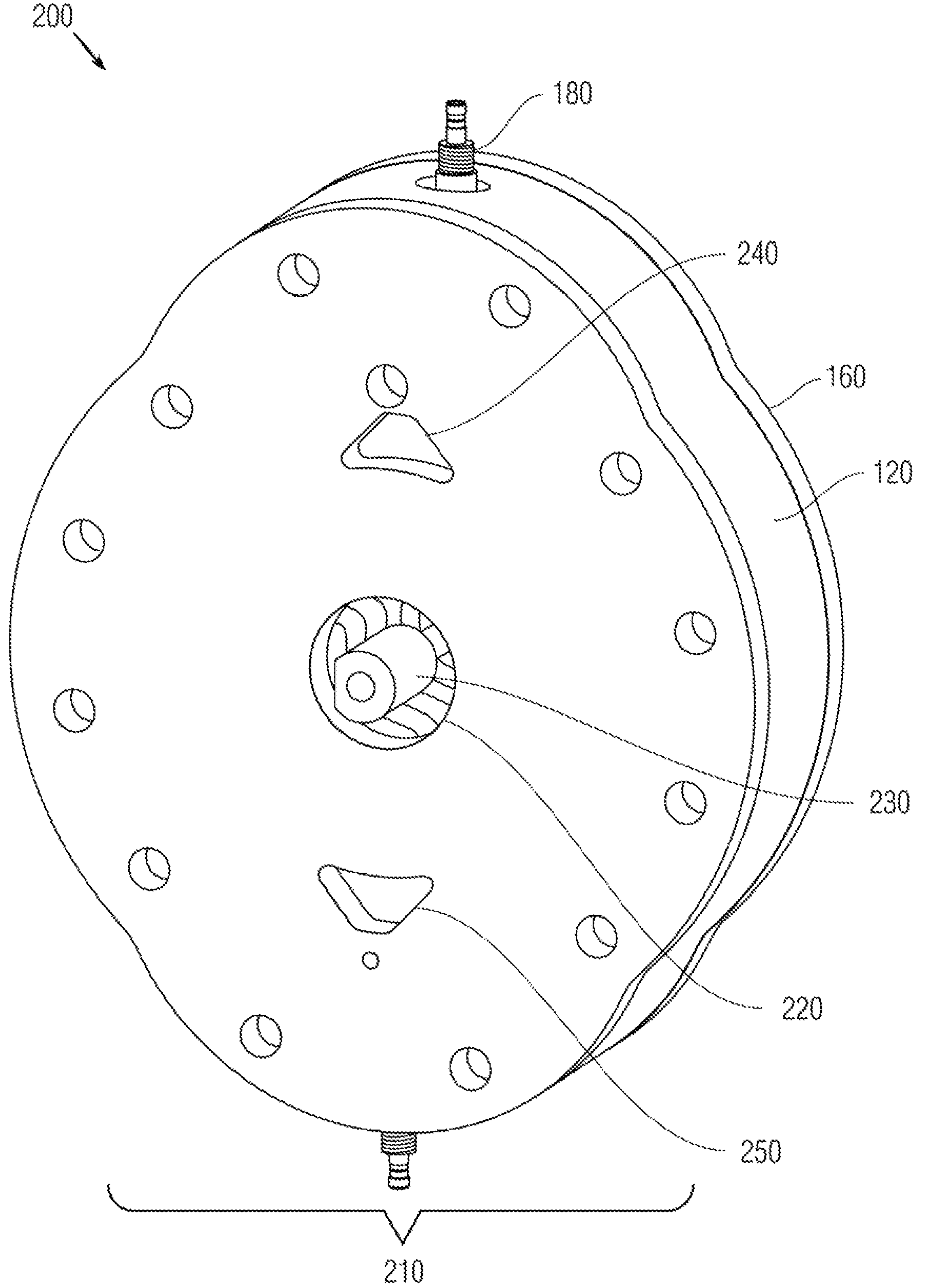
FIG. 2 is a perspective view of the first assembly.

FIG. 2 shows a perspective view 200 of the exemplary rotary engine assembly 210 with both fore and aft covers. The fore cover 220 includes a cam shaft 230 protruding through a center orifice, and upper and lower windows 240 and 250 that serve alternately as intake and exhaust ports. A plurality of assemblies 210 can be coaxially concatenated together along a common shaft 230. Major axis length of about one foot is exemplary.

Figure 3:
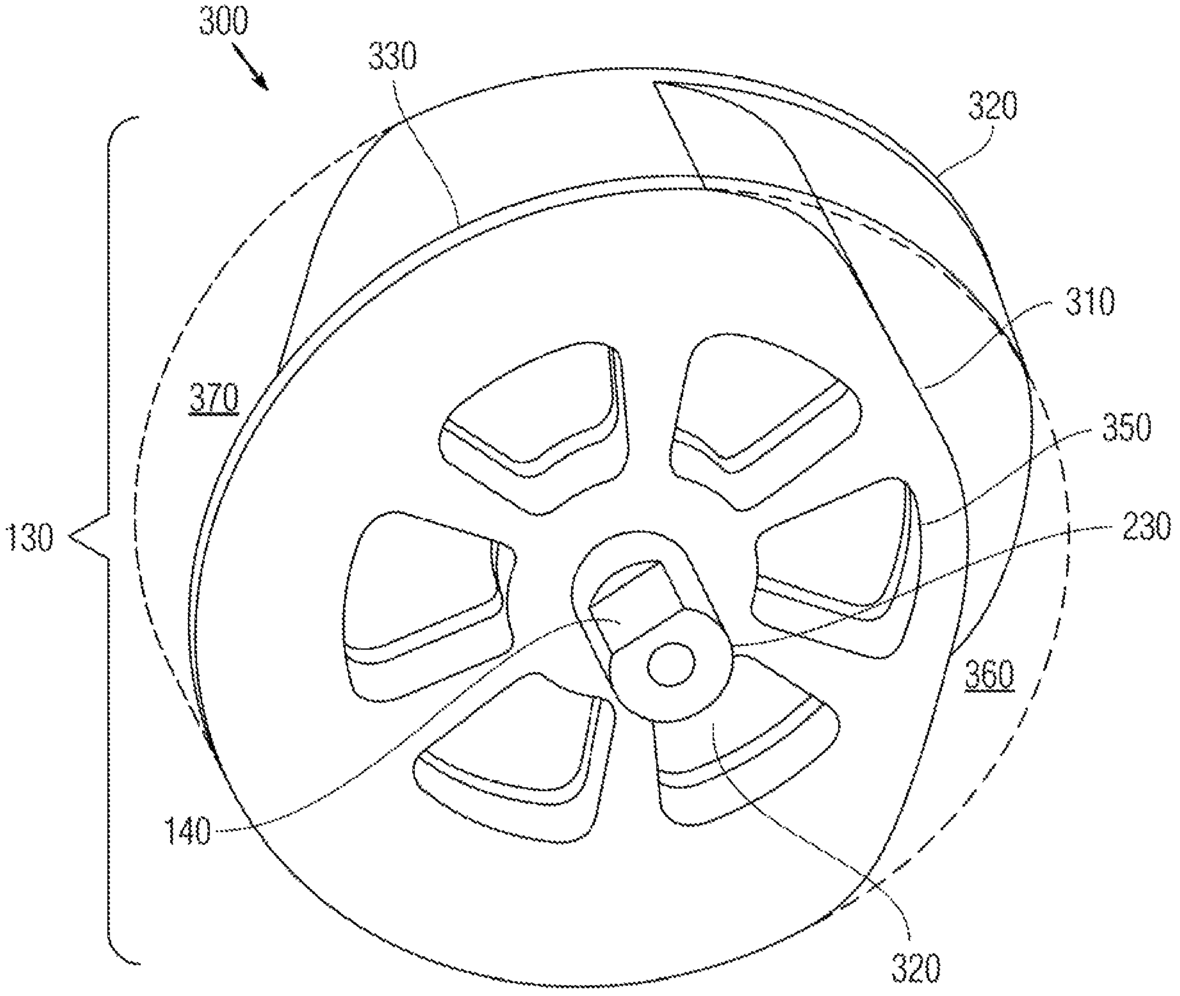
FIG. 3 is a perspective view of a first rotor.

FIG. 3 shows a perspective view 300 of the exemplary rotor 130. An interior cam face 310 presents a partially elliptical radial profile, bounded along the axis of the shaft 230 by circular aft and fore wings 320 and 330. The shaft 230 includes a flat notch 340. Angularly spaced cutouts 350 are disposed along the outer faces of the fore wing 330 to reduce inertial mass and extending through the rotor 130 until almost reaching its center plane.

A similar set of angularly spaced cutouts 340, 350 extend in from the opposite side of the rotor 130 that aligns with spaces associated with the aft wing 320. An aft angularly extending volumetric space 360 is defined between the cam face 310 and the outer rim formed by the aft wing 320. A fore angularly extending volumetric space 370 is defined between the cam face 310 and the outer rim formed by the fore wing 330.

Figure 4:
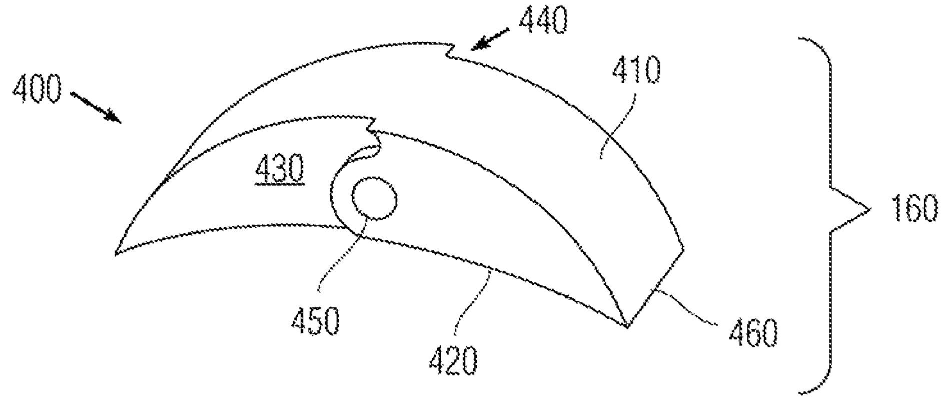
FIG. 4 is a perspective view of a first flap valve.

FIG. 4 shows a perspective view 400 of the exemplary flap valve 160, which forms a convex-concave wedge shape. An outer arc face 410 forms the convex portion, while an inner arc face 420 forms the concave portion. Outer and inner indents 430 and 440 provide movable clearance for the rotor wings 320 and 330. A shaft-hole 450 through the pivot axis enables the valve 160 to rock (i.e., sea-saw) back and forth, to alternatingly raise and descend the cam follower edges 460 within the flap's respective cavity 150.

Figure 5:
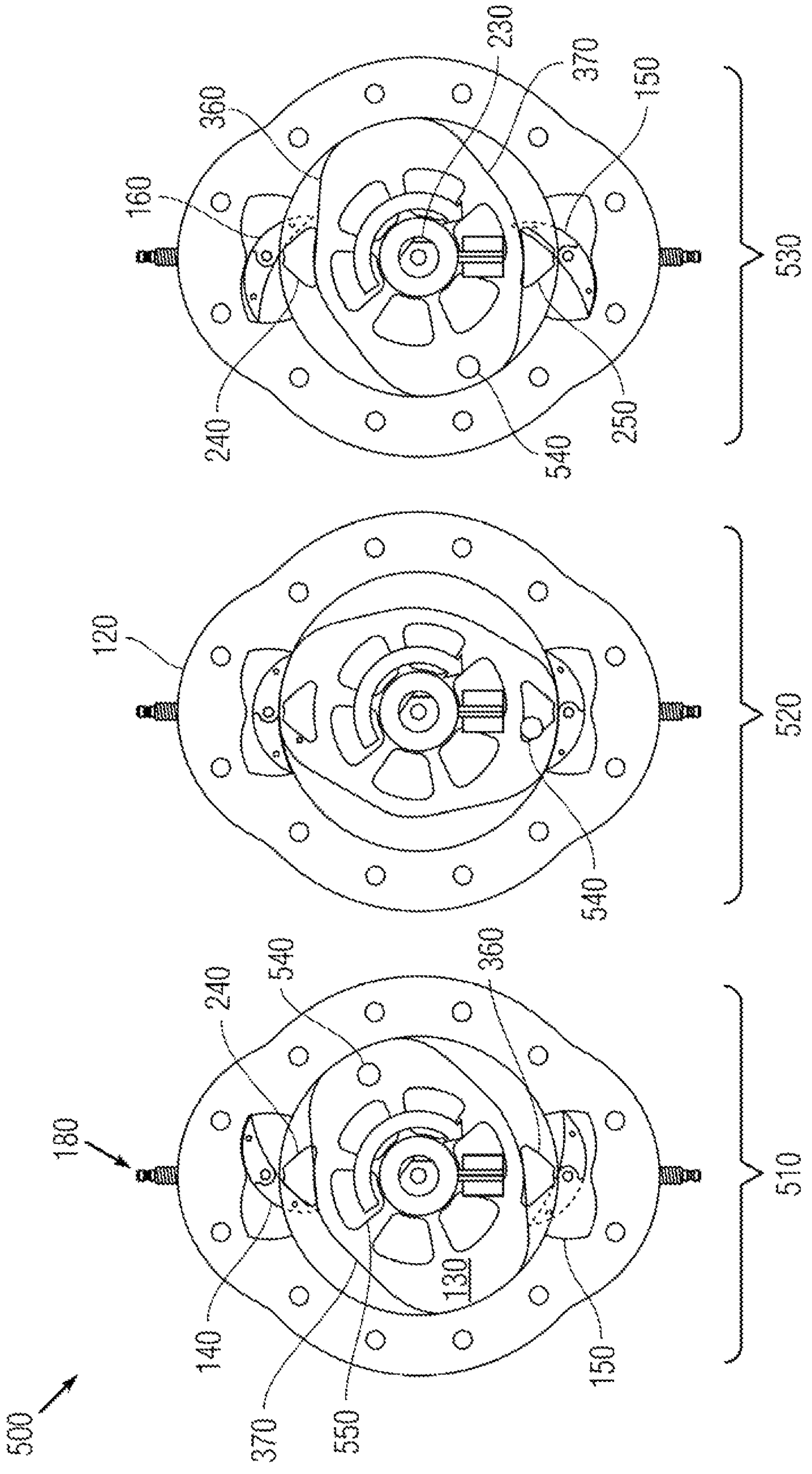
FIG. 5 is an elevation view of stroke cycles for the engine.

FIG. 5 shows an elevation view 500 (facing aft) of the exemplary assembly 110 for three operational configurations 510, 520 and 530 while cycling (absent the fore cover 220). A position marker 540 identifies relative rotational position of the rotor 130 that spins clockwise 550. The first configuration 510 denotes intake through upper window 240 and compression of the upper cavity 140. This also denotes compression of volume 370 the left edges 460 of the valves 160 and exhaust of volume 360 to produce power through the exhaust through lower window 250 to produce power at the lower cavity 150. The marker 540 is at two o'clock.

The second configuration 520 illustrates the rotor 140 at top dead center with the marker 540 just after six o'clock. Both valves 160 are flush with the rotor surface 310. The upper cavity 140 stores compressed gas, while the lower cavity 150 is effectively vacuous. In the third configuration 530, the exhaust from the power stroke of configuration 510 pushes out the upper window 240 on the aft cover 170 while the compressed air at the upper cavity 140 ignites and produces a power stroke in volume 360. Meanwhile, the rotor 130 draws fresh intake air into volume 370 through the lower window 250 on the aft cover 170 and concurrently compresses the air in volume 370 into the lower cavity 150. Note that wings 320 and 330 open and close the upper window 240 and lower window 250 as respective intake and exhaust ports as they sweep past.

Figure 6:
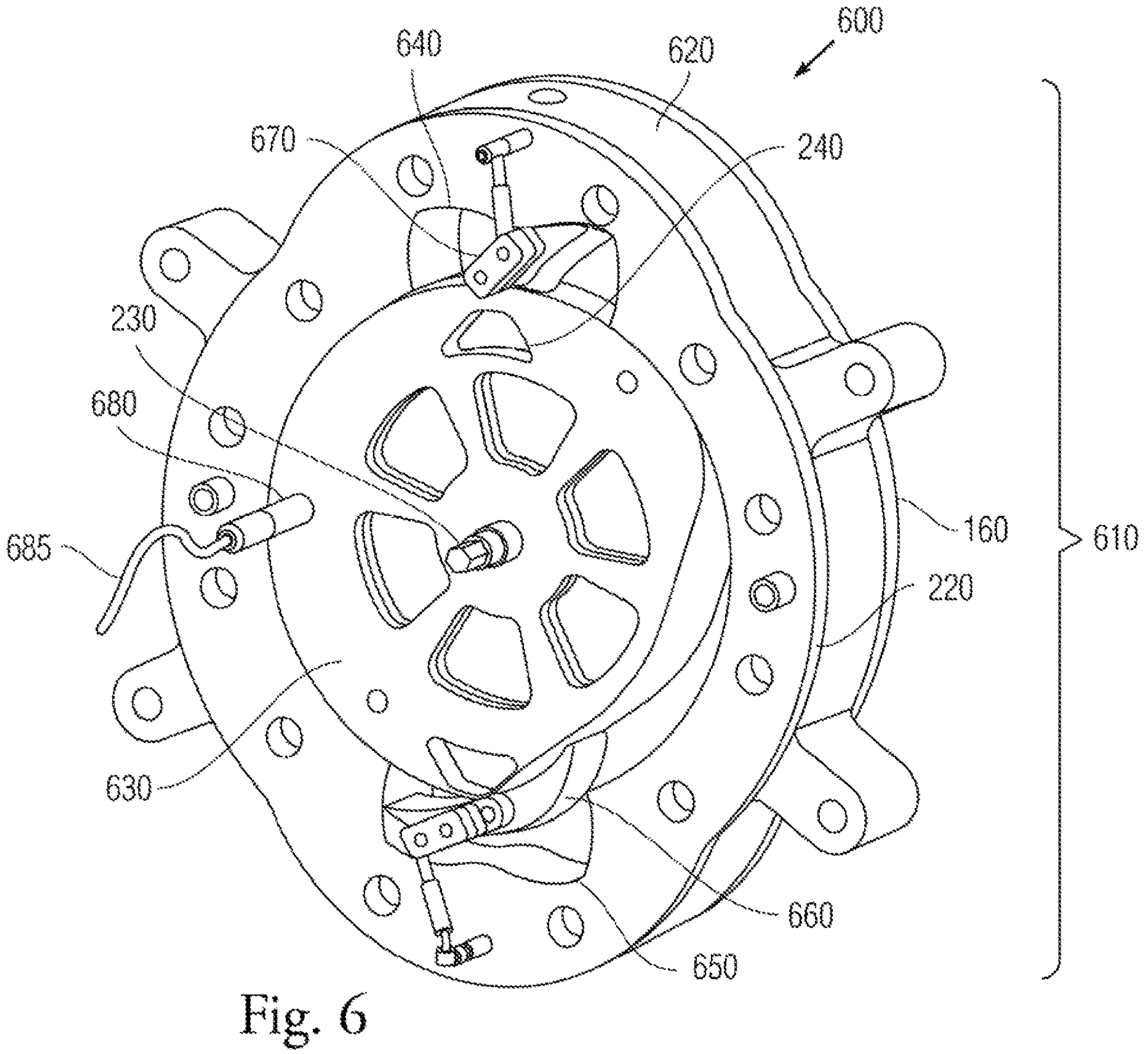
FIG. 6 is a perspective view of a second engine.

FIG. 6 shows a perspective view 600 of an alternative embodiment of the motor assembly 610. A housing 620 is disposed between the aft and fore covers 170 and 220 to contain an exemplary rotor 630. Upper and lower cavities 640 and 650 for receiving flap valves 660 are disposed above and below the rotor 630. Accompanying rockers 670 hinged to the valves 660 travel in sea-saw fashion against borders within the cavities 640, 650 for piloting the valves 660. The rockers 670 operate radially beyond the windows 240 and 250 in the fore cover 220. An optional pressure sensor 680 taps into the cover plate 220, and a wire lead 685 extends from the sensor 680. The rotor 630 rotates along the shaft 230 within the housing 620.

Figure 7:
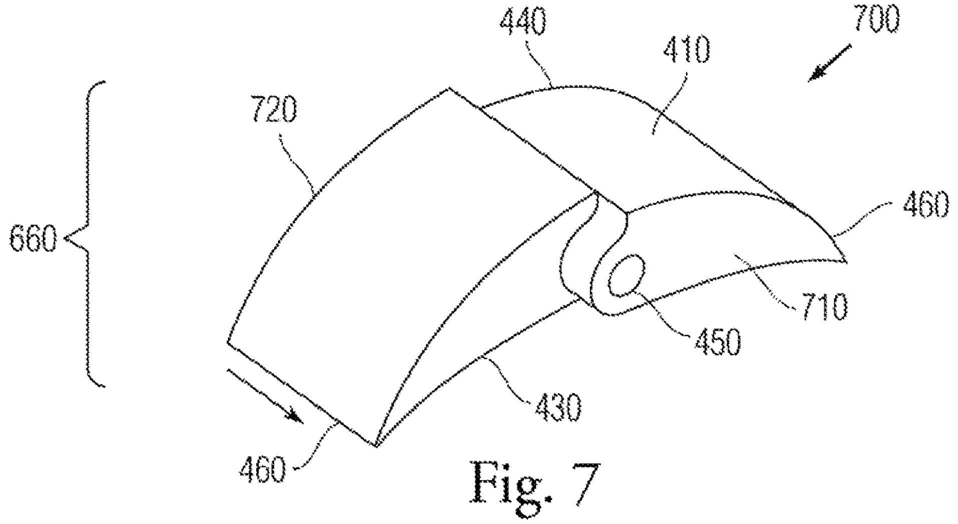
FIG. 7 is a perspective view of a second flap valve.
Figure 8:
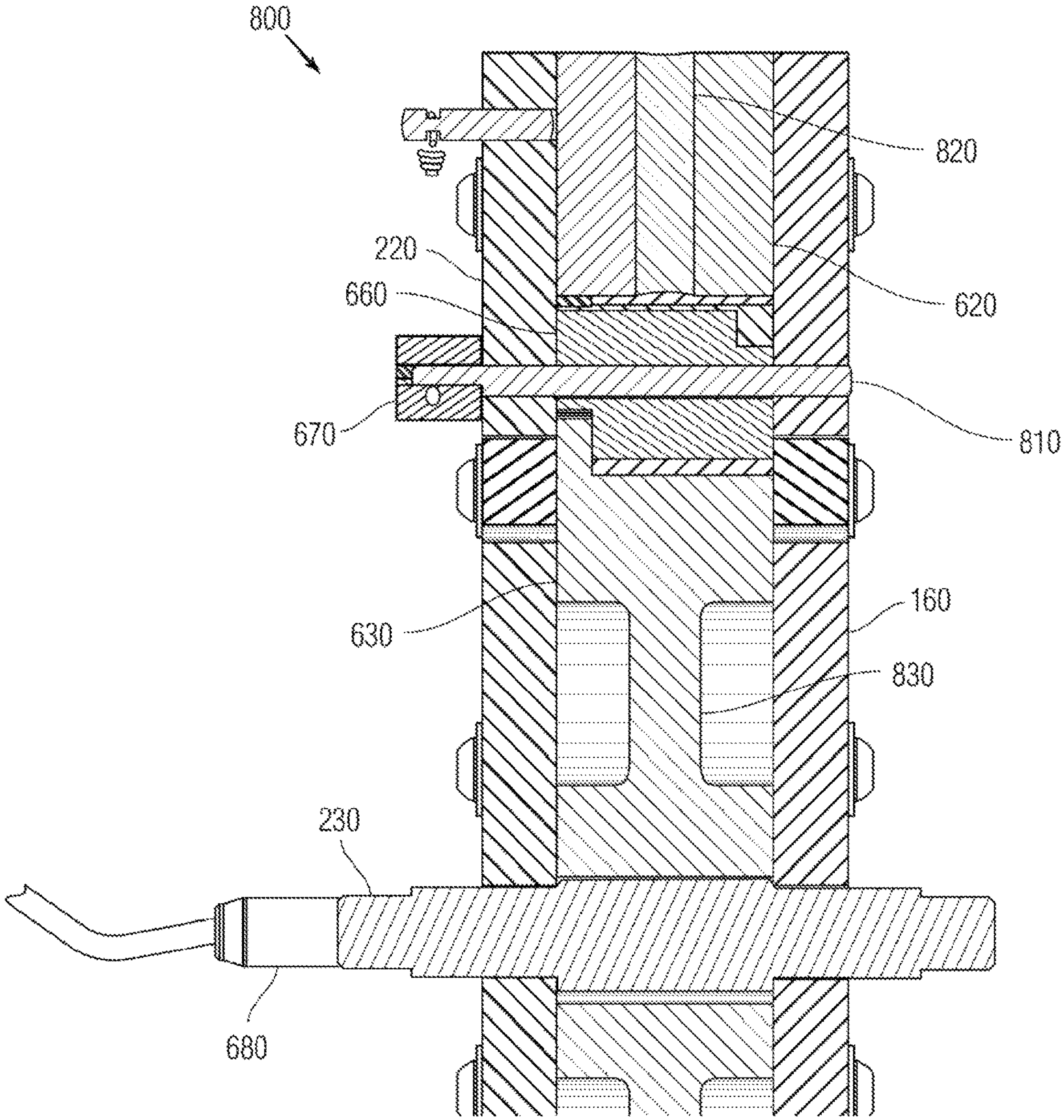
FIG. 8 is an elevation view of the second engine.
Figure 9:
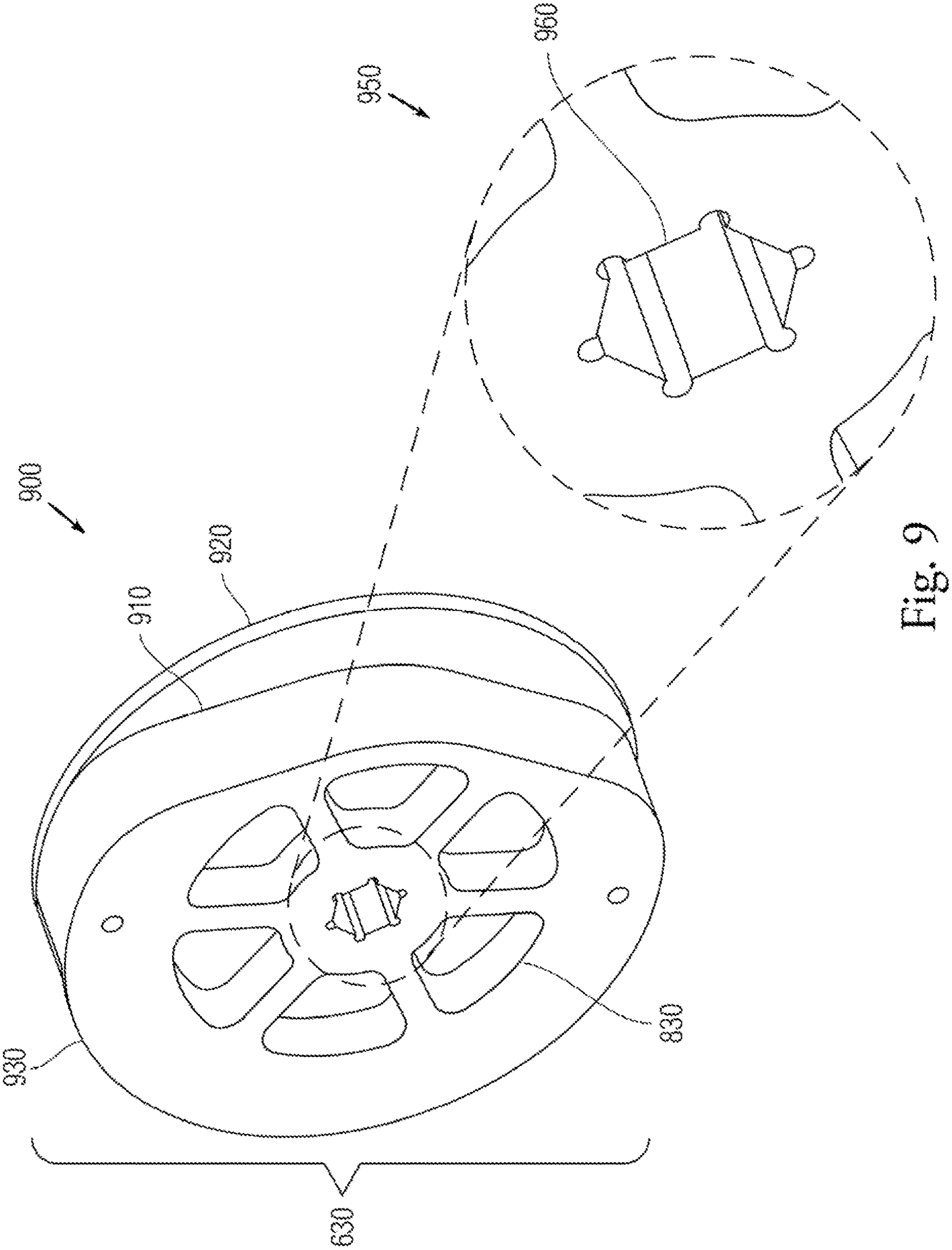
FIG. 9 is a perspective view of a second rotor.

FIG. 7 shows a perspective view 700 of an alternative exemplary flap valve 660, substantially similar to the valve 160. The outer and inner sides 710 and 720 extend axially outward along the shaft-hole 450 beyond the indents 430 and 440. FIG. 8 shows an elevation view 800 of the motor assembly 610. A flap shaft 810 enables the valve 660 and the rockers 670 to swing back and forth. The housing 620 includes upper and lower orifices 820 through which to insert the sparkplugs 180. The rotor 630 includes cavities 830 to reduce inertial mass. FIG. 9 shows a perspective view 900 of the exemplary rotor 630. A cam profile 910 sandwiches between aft and fore wings 930 and 940. An oval region 940 at the center is shown in a detail view 950 featuring a hexagonal cavity 960 through which the shaft 230 passes for spinning the rotor 630.

Figure 10:
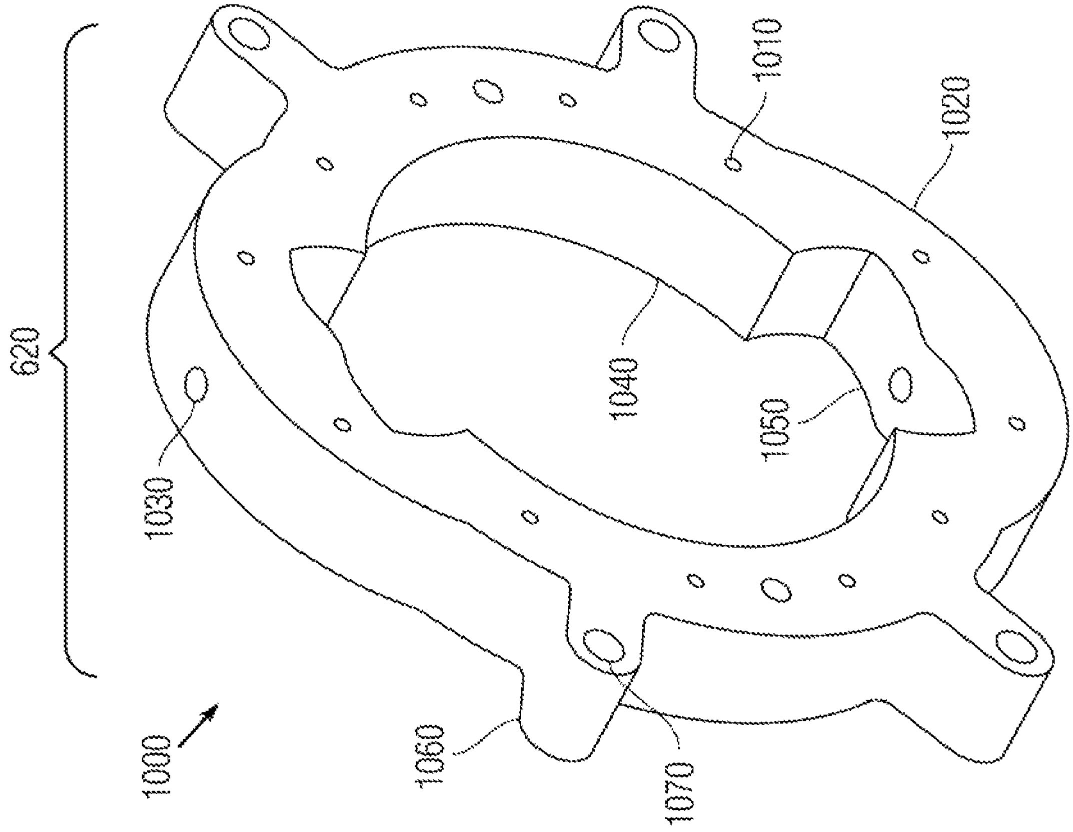
FIG. 10 is a perspective view of a second housing.

FIG. 10 shows a perspective view 1000 of the exemplary housing 620. Note that the annular housing shape resembles a uniform planar axial extrusion, and exhibits quadrilateral symmetry. The outer periphery includes circular segments 1010 flanked above and below by elliptical protrusions 1020. Sparkplugs 180 can be inserted into top and bottom through-holes 1030 on the protrusions 1020. The inner periphery includes circular races 1040 with cutouts 1050 that provide cavities 150 in which the valves 640 can pivot. Mounting flanges 1060 extend from the circular segments 1010, and include through-holes 1070 for attaching the housing 620 to a platform.

Figure 11:
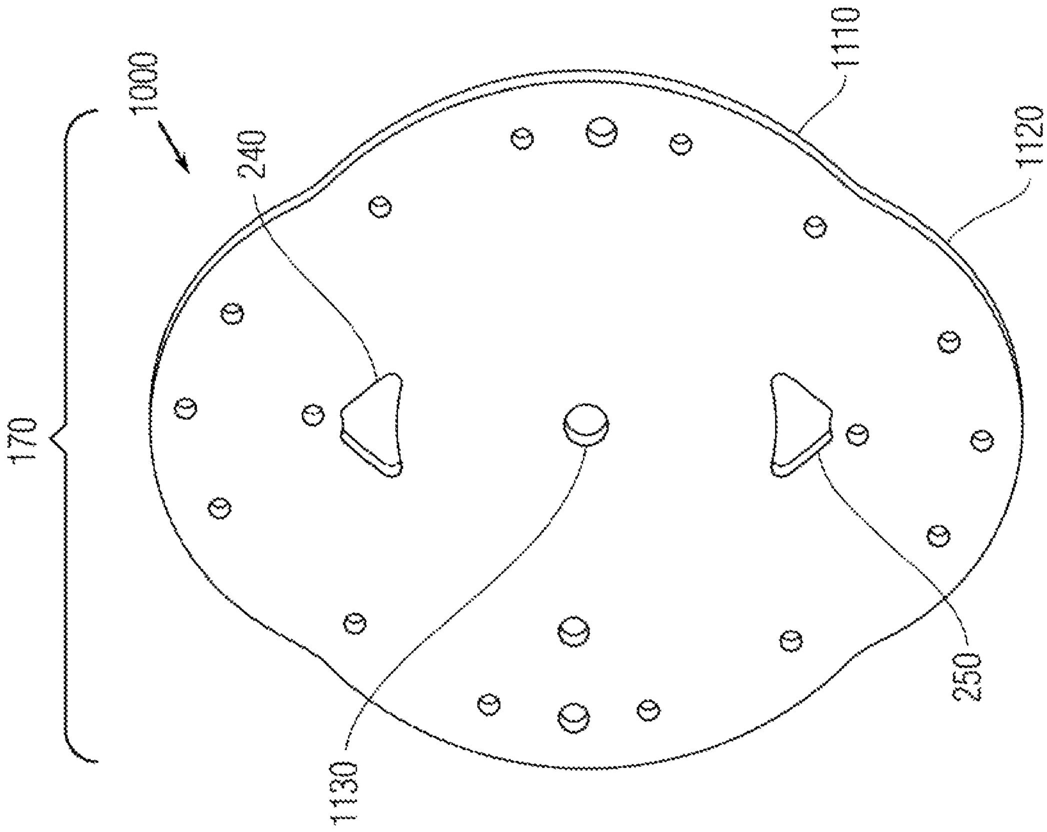
FIG. 11 is a perspective view of a cover.

FIG. 11 shows a perspective view 1100 of the exemplary aft cover 170, which constitutes a metal plate. The periphery includes circular segments 1110 flanked by elliptical protrusions 1120. A center hole 1130 is disposed within the cover 170 through which the shaft 230 passes therethrough. Interior arc-triangular cutouts are disposed respectively above and below the hole 1130 as upper and lower windows 240, 250 to enable intake and exhaust gasses to pass through in line with their counterpart windows 240, 250 on the fore cover 220.

Figure 13:
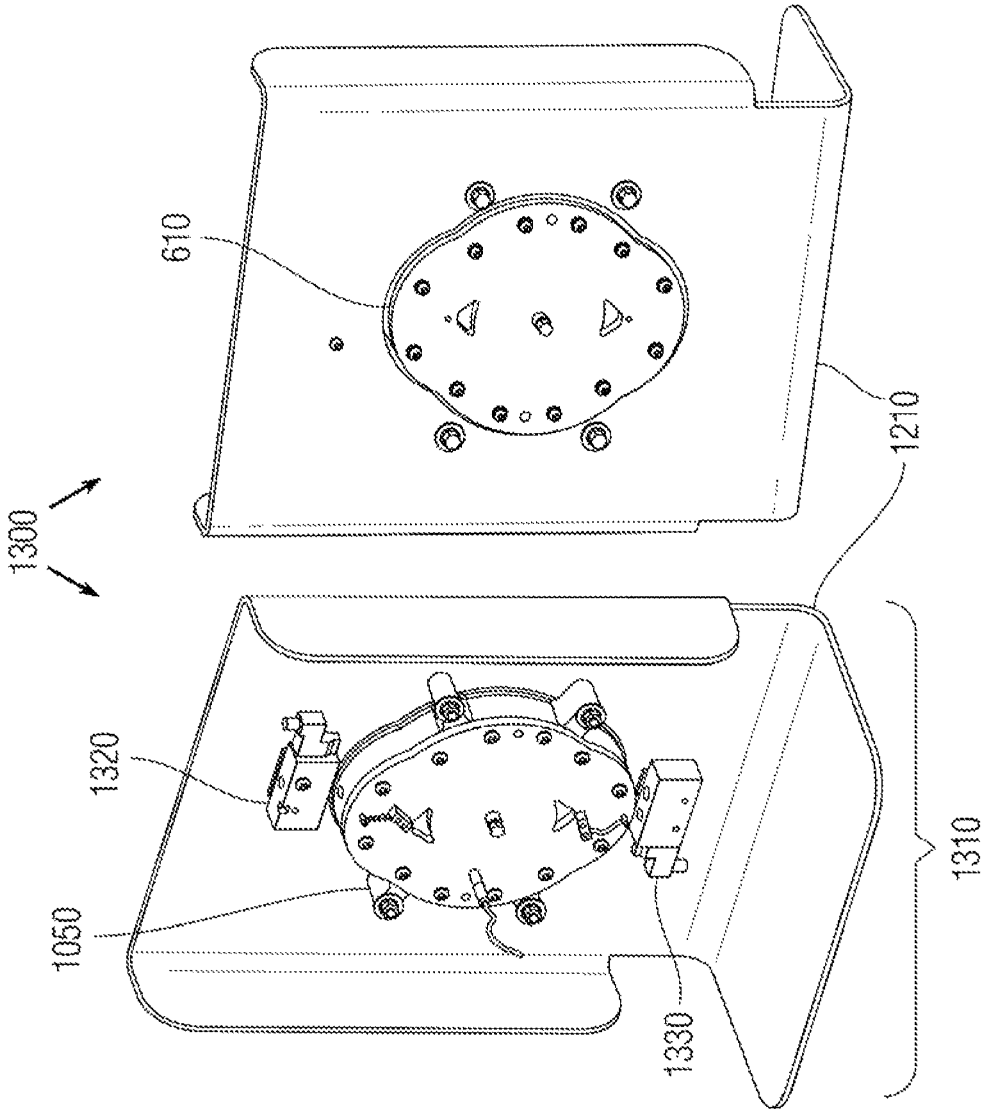
FIG. 13 is a perspective view of the engine mounted to the bracket.
Figure 12:
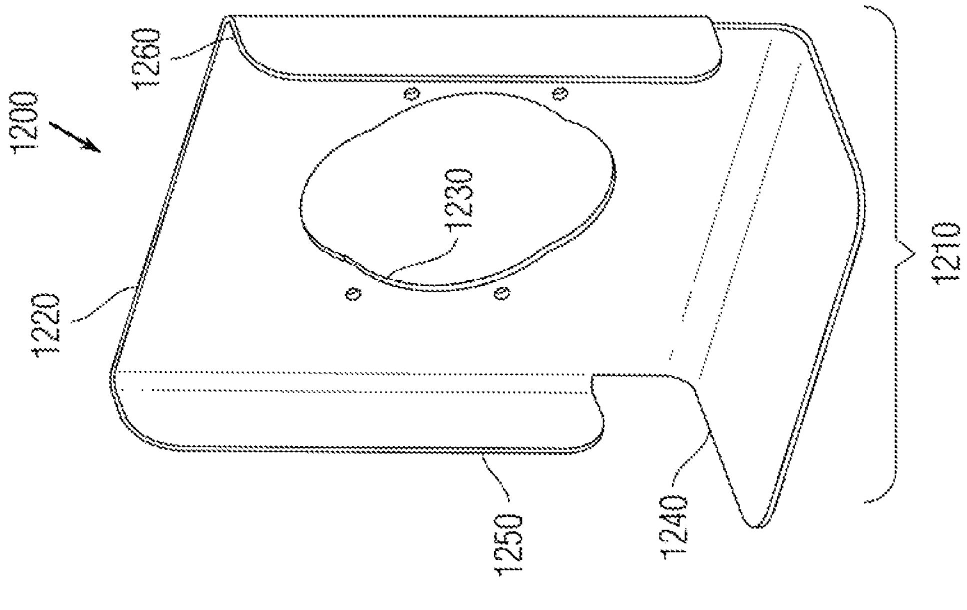
FIG. 12 is a perspective view of a mounting bracket.

FIG. 12 shows a perspective view 1200 of an exemplary standing bracket 1210 as a platform for the motor 610. The bracket 1210, formed from bent sheet metal, includes a vertical wall 1220 with a cutout 1230 through which to insert the housing 620 and cover 220. A horizontal foot 1240 extends outward from the wall 1220. Vertical wings 1250 and 1260 extend laterally from the wall 1220. FIG. 13 shows a perspective view 1300 of the exemplary motor 610 within the bracket 1210 as an installed assembly 1310. Actuators 1320 and 1330 are disposed above and below the motor 610 for pivoting valves 660 in conjunction with their associated rockers 670.

Figure 14:
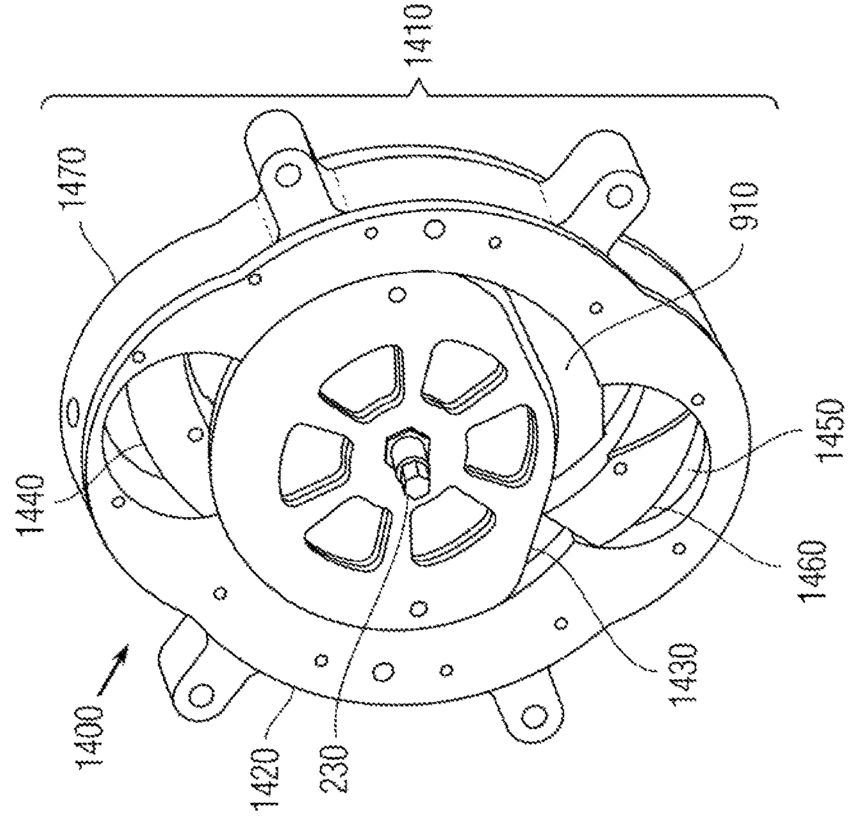
FIG. 14 is a perspective view of a third engine.

FIG. 14 shows a perspective view 1400 of another exemplary motor assembly 1410. A housing 1420 contains a rotor 1430 flanked by upper and lower cavities 1440 and 1450. Seasaw valves 1460 pivot above and below the rotor within their respective cavities 1440, 1450. An aft cover 1470 (with fore cover not shown) faces against the housing 1420. The rotor 1430 rotates around a shaft 1470 for turning the cam profile 910 against the valves 1460.

Figure 15:
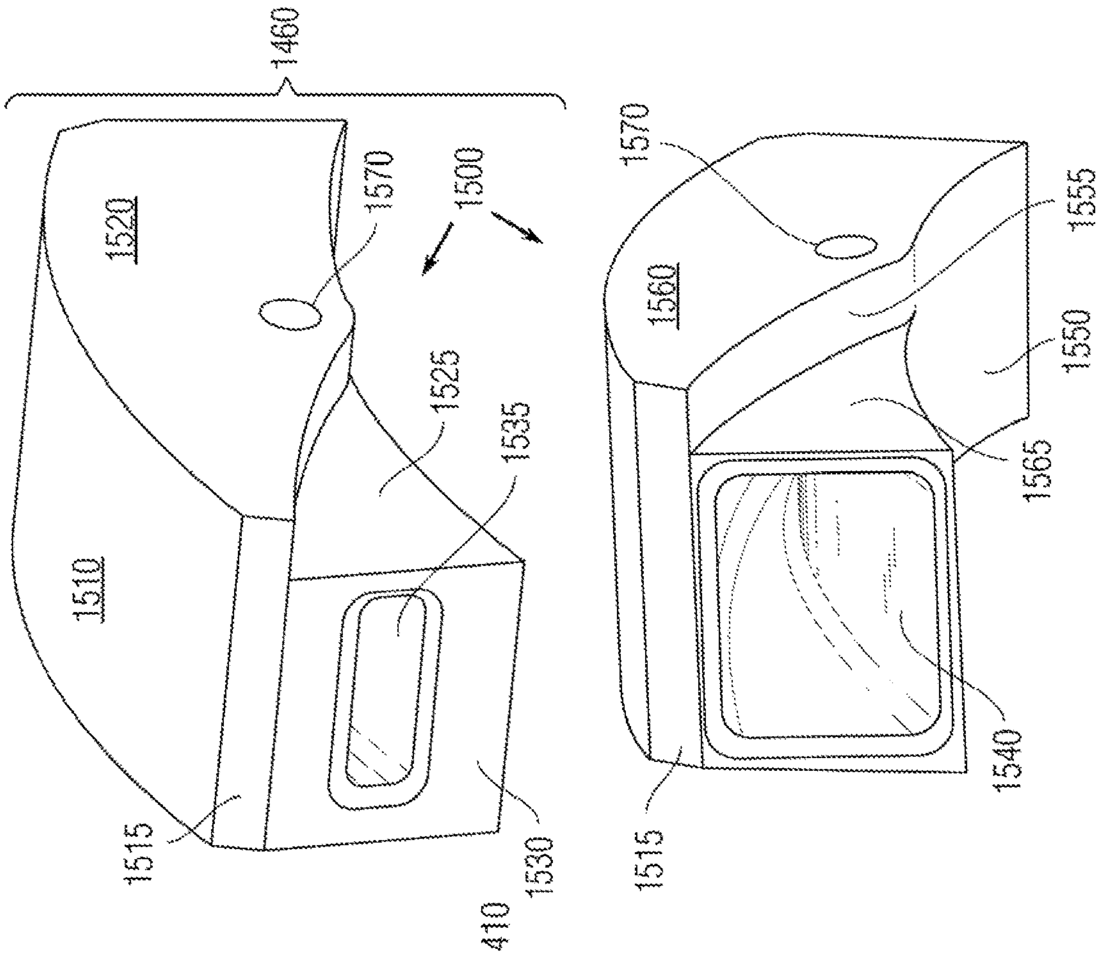
FIG. 15 is a perspective view of a third flap valve.

FIG. 15 shows perspective views 1500 of the alternative flap valve 1460. An outer convex arc face 1510 forms the convex portion ending in chamfered edges 1515. A fore face 1520 with an indent 1525 is disposed on the front side of the arc face 1510. A first end 1530 includes a narrow passage 1535 for intake, and is disposed opposite a wide passage 1540. An inner concave arc face 1550 and an indent face 1555 are opposite the outer face 1510. An aft face 1560 with an indent 1565 is disposed on the rear side of the arc face 1510. A hole 1570 enables a shaft 810 to pass therethrough for rocking the valve 1440.

The rotary engine generates power by spinning a rotor 130 (or 630, 1430) inside a housing 120 (or 620, 1420). The housing is closed by two covers 170, 220 that bolt to the housing 120. There are exhaust and intake ports as upper and lower windows 240, 250 in the covers 170, 220. Within the housing 120 is the rotor 130 and two flap valves 160 (or 660, 1460). The assembly forms a unique 4-stroke engine (intake, compression, power and exhaust). The rotor 130 spins on its shaft 230 when a compressed fuel-air mixture ignites, and the resulting combustion forces the flap valve 160 open and drives the rotor 130 clockwise in a power-stroke. Exhaust, intake and compression occur in similar manner. Before attempting to describe the four strokes, some salient features about the rotor 130 and flap valve 160 are provided.

The rotor 130 has a central oblong cam shape 310 with two wings 320 and 330. The cam shaft 230 protrudes axially from the rotor 610. One should note that a hollow-shaft rotor is quite possible. The purpose of the wings 320, 330 is to alternately block the intake and exhaust windows 240, 250 in both covers 170, 220. The flap valve 160 functions to direct the flow of the following: the fuel-air mixture in through the intake window 240 during intake, the fuel-air into the combustion cavity 150 during compression, the combustion products out of the combustion cavity 150 during the power stroke, and the exhaust gases out of the exhaust window 250 during the exhaust stroke.

The flap valve 160 toggles back and forth to create a barrier against which all four strokes operate. The cam follower edges 460 of the flap valve 160 are in contact with the rotor cam surface 310 while spinning. Clearance is required between the flap valve 160 and the rotor wings 320, 330.

The following configurations 510, 520 and 530 illustrate the four strokes. Using view 500 and an analog clock face for reference, intake occurs between twelve o'clock and one o'clock (approximately configuration 510) when the rotor 130 travels past the flap valve 160 so as to expose the upper window 240 as the intake port in front cover 220. The upper window 240 directly opposite the intake on the aft cover 170 is the exhaust port and closes via the rotor wing 330. The fuel-air mixture is drawn into the space 370 created by the rotor cam surface 310, rotor wing 330, inner housing wall 1040, and covers 170, 220. Meanwhile, the spent gasses from the previous power stroke are pushed out the upper window 240 as the exhaust port at six o'clock (configuration 520) contemporaneous with the next power stroke begins at seven o'clock and a fresh volume of fuel-air mix is being compressed at eleven o'clock.

By the end of the stroke at six o'clock (in configuration 520), the rotor 130 is blocking both upper and lower windows 240, 250 (as respective intake and exhaust ports), the flap valves 160 pivot back to the neutral position, and the space 370 is entirely filled with the fuel-air mixture. All of the exhaust gasses have been expelled from the lower window 250 as the exhaust port, and the rotor 130 has sealed that window 250 as well. The fuel-air mix drawn into the space 370 is ready to be compressed into the lower cavity 150 while the compressed gasses in the upper cavity 140 are ready to be ignited and drive the rotor 130 around. The exhaust gases that fill the left portion of the upper cavity 140 will be pushed out the upper window 240 as the exhaust port.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An internal combustion rotary engine that produces mechanical torque comprising:
- an annular planar housing with a substantially circular annulus flanked by first and second cavities,
- an axial shaft disposed within said annulus;
- a rotor disposed on said shaft and rotating within said annulus; and
- first and second valves disposed within respective said cavities, wherein
- each valve has an arc wedge having an outer convex surface and an inner concave surface forming a crescent cross-section,
- a shaft hole between and parallel to said surfaces along a rocking axis, and
- a pivot shaft that passes through said shaft hole that enables said wedge to rock back and forth within the cavity in see-saw motion when the rotor rotates.

2. The engine according to claim 1, further comprising:
- fore and aft covers, each cover having a center orifice to accommodate said axial shaft, and first and second ports exposed to ambient and respectively adjacent said first and second cavities, and
- said pivot shaft turns on a pivot axis within said fore and aft covers.

3. The flap valve according to claim 1, further comprising:
- an air intake through said housing leading to said annulus;

a fuel intake through said housing leading to said annulus; and an exhaust port through said housing from said annulus.

* * * * *